United States Patent [19]
Shimokuni et al.

[11] Patent Number: 5,413,218
[45] Date of Patent: May 9, 1995

[54] CASSETTE FOR ACCOMMODATING A RECORDING MEDIUM

[75] Inventors: Kenji Shimokuni; Kenji Ogisu, both of Miyagi, Japan

[73] Assignee: Sony Corporation, Japan

[21] Appl. No.: 192,822

[22] Filed: Feb. 7, 1994

Related U.S. Application Data

[62] Division of Ser. No. 102,888, Aug. 6, 1993.

[30] Foreign Application Priority Data

Aug. 14, 1992 [JP] Japan ................................. 4-217010
Jul. 28, 1993 [JP] Japan ................................. 5-186153

[51] Int. Cl.⁶ .......................................... B65D 85/672
[52] U.S. Cl. ................... 206/387.1; 206/459.5
[58] Field of Search ......... 206/387, 459.5, 472

[56] References Cited

U.S. PATENT DOCUMENTS

| | | |
|---|---|---|
| 4,365,711 | 12/1982 | Long et al. |
| 4,385,693 | 5/1983 | Gelardi et al. ............ 206/459.5 |
| 4,463,042 | 7/1984 | Fujiwara et al. |
| 4,779,729 | 10/1988 | Aoyama. |
| 4,789,058 | 12/1988 | Blaney ............... 206/459.5 |
| 5,007,964 | 4/1991 | Tsukisaka et al. |
| 5,092,927 | 3/1992 | Curti et al. |
| 5,248,037 | 9/1993 | Kornberg ............. 206/472 |
| 5,323,904 | 6/1994 | Katagiri et al. ........ 206/387 |

FOREIGN PATENT DOCUMENTS

| | | |
|---|---|---|
| 854022 | 10/1970 | Canada. |
| 3222455 | 3/1983 | Germany. |
| 55-124651 | 9/1980 | Japan. |
| 3210181 | 8/1988 | Japan. |
| 3281282 | 12/1991 | Japan. |
| 8607371 | 12/1986 | WIPO. |

*Primary Examiner*—David T. Fidei
*Attorney, Agent, or Firm*—Ronald P. Kananen

[57] ABSTRACT

A write area (10) is formed as a writable area on a recording medium accommodating cassette by a printing process using a printing ink containing a proper amount of protein powder made of natural collagen as a main component. In the write area (10), owing to hydrophilic group of the protein powder, even when something is written therein with a water base pen, its ink can be prevented from being floated therefrom and hence the writing can be carried out satisfactorily.

3 Claims, 2 Drawing Sheets

CASSETTE FOR ACCOMMODATING A RECORDING MEDIUM

This application is a division of application Ser. No. 08/102,88, file Aug. 6, 1993.

BACKGROUND OF THE INVENTION

1. Field of the Invention

The present invention relates to a plastic tape cassette for accommodating therein a recording medium such as a magnetic tape or the like and a plastic cassette case for keeping therein a tape cassette.

2. Description of the Related Art

In a tape cassette for accommodating therein a recording medium such as a magnetic tape or the like and a cassette preserving case for keeping therein the cassette, a label is bonded to the surface (external surface) thereof or an index card is held on the surface thereof in order for the user to confirm contents of information recorded on the magnetic tape. In general, the label is made of a paper material having an adhesive attached to the rear surface thereof. Recording information (title of musical composition or the like) is written in the label and bonded to the surface of the tape cassette at its predetermined position. On the other hand, in the cassette preserving case, an index card made of a paper material is accommodated within the cassette preserving case and recording information is written in this index card.

It is frequently observed that the conventional label bonded to the tape cassette is torn off therefrom due to the change of environmental conditions or by fingers because the label is bonded to the tape cassette by the adhesive. If such tape cassette whose label is nearly torn off is loaded onto a cassette deck (particularly, a front loading type cassette deck or mobile AV (audio-video) apparatus that are utilized under severe environmental condition in use) as it is, there is then the risk that the label torn off is caught by the cassette deck and a trouble such as malfunction of cassette deck or the like occurs. Further, a small label tends to be torn off easily as compared with a large label and is inconvenient to handle. Furthermore, when the index card is utilized, a space for accommodating the index card becomes necessary, thereby causing the cassette preserving case to become large in size. Also, there is the risk that the index card will be lost.

OBJECTS AND SUMMARY OF THE INVENTION

In view of the aforesaid aspects, it is a general object of the present invention to provide improved tape cassette and cassette case in which the aforesaid shortcomings and disadvantages encountered with the prior art can be eliminated.

More specifically, it is an object of the present invention to provide a recording medium accommodating cassette and a cassette preserving case in which a write area on which recording information or the like is written is formed without using a label or index card.

According to an aspect of the present invention, there is provided a recording medium accommodating cassette in which a recording medium is accommodated within a housing formed of a pair of upper and lower cassette shells made of a plastic material. This recording medium accommodating cassette comprises a writable area formed at a predetermined position on an outer surface of the housing according to a printing using a printing ink containing a proper amount of protein powder having natural collagen for its main component.

According to another aspect of the present invention, there is provided a plastic cassette preserving case having a cassette accommodating portion in which a recording medium accommodating cassette accommodating a recording medium in its housing is accommodated. This plastic cassette preserving case comprises a writable area formed at a predetermined position on an outer surface of the housing according to a printing using a printing ink containing a proper amount of protein powder having natural collagen for its main component.

The above and other objects, features, and advantages of the present invention will become apparent from the following detailed description of an illustrative embodiment thereof to be read in conjunction with the accompanying drawings, in which like reference numerals are used to identify the same or similar parts in the several views.

DETAILED DESCRIPTION OF THE PREFERRED EMBODIMENT

An embodiment of the present invention will hereinafter be described with reference to the drawings.

Figure 1:
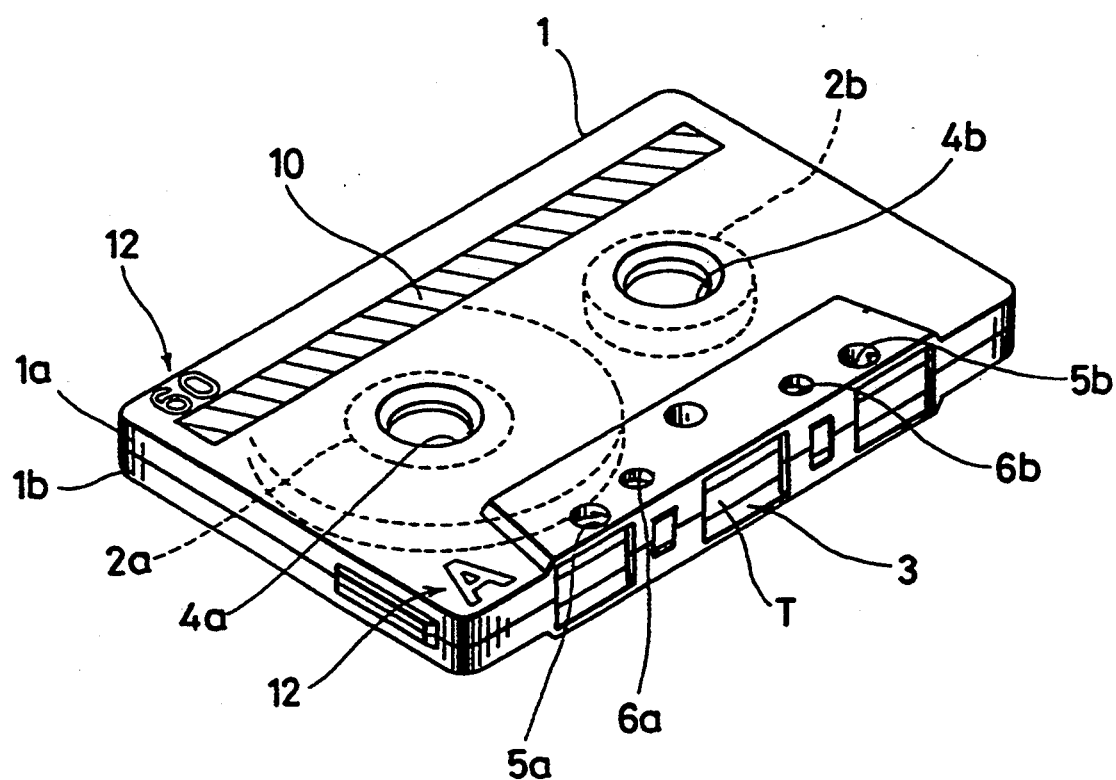
FIG. 1 is a perspective view showing a tape cassette according to an embodiment of the present invention.

FIG. 1 of the accompanying drawings shows a plastic tape cassette (i.e., audio compact tape cassette) as an example of a tape cassette for accommodating therein a recording medium according to the present invention. As shown in FIG. 1, a tape cassette 1 is formed by fastening a pair of upper and low cassette shells 1a, 1b, each being made of ABS (acrylonitrile butadiene styrene) resin. A pair of left and right reel hubs 2a, 2b around which a magnetic tape T is wound are accommodated in the inside of the tape cassette 1 so as to become freely rotatable. The magnetic tape T taken out from the hubs 2a, 2b is exposed through a front opening portion 3. Hub drive shafts (not shown) are inserted into hub drive shaft insertion apertures 4a, 4b. Capstans (not shown) are inserted into capstan insertion apertures 5a, 5b, and position determining apertures 6a, 6b are formed near the capstan insertion apertures 5a, 5b, respectively. On the surface of the tape cassette 1 at its predetermined position, i.e., at the position behind the hub drive shaft insertion apertures 4a, 4b on the upper and lower surface portions of the tape cassette 1 is formed a write area 10 in which a title of musical composition or the like recorded on the magnetic tape T is written. Further, logotypes 12 are printed on the same surface portion of the tape cassette 1 as the write area 10.

Figure 2:
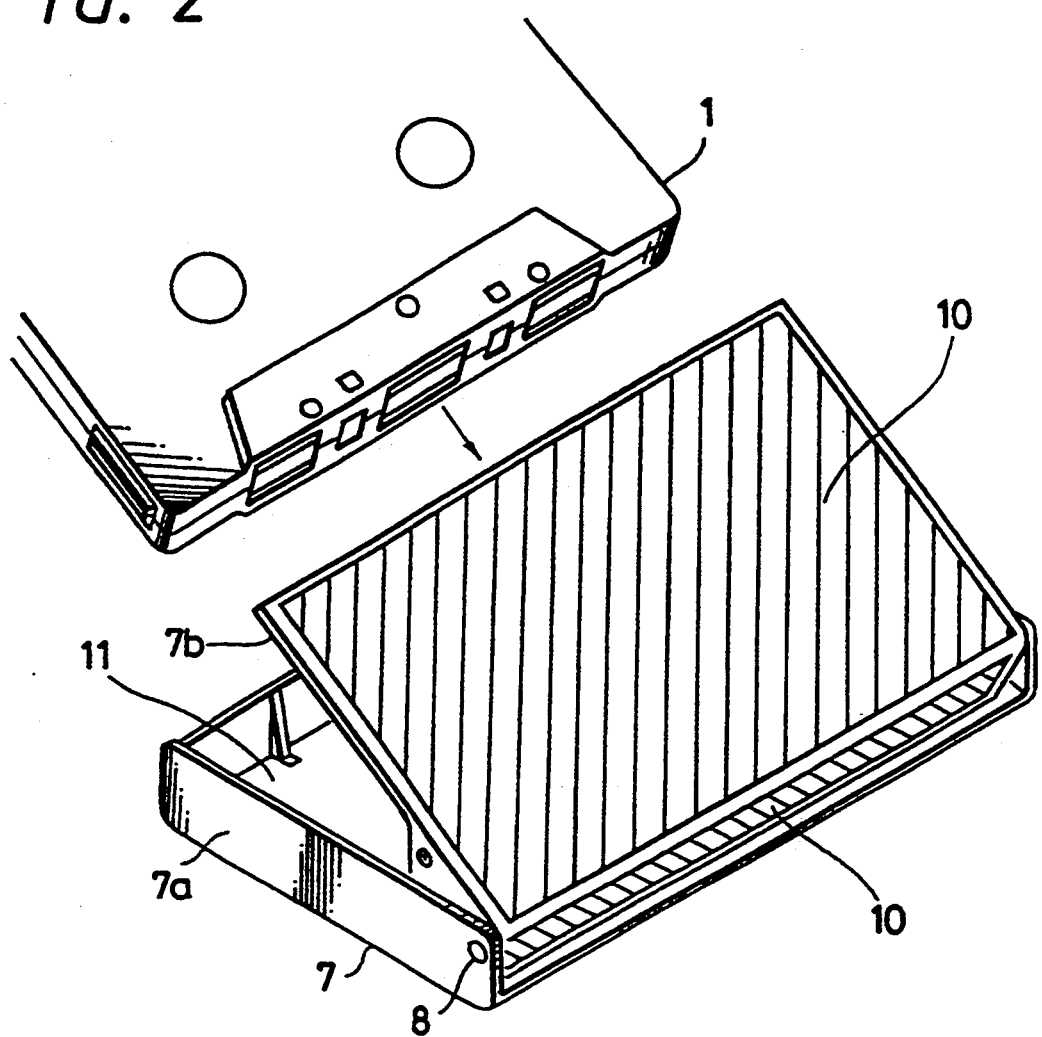
FIG. 2 is a perspective view showing a cassette preserving case according to an embodiment of the present invention with its lid being opened.
Figure 3:
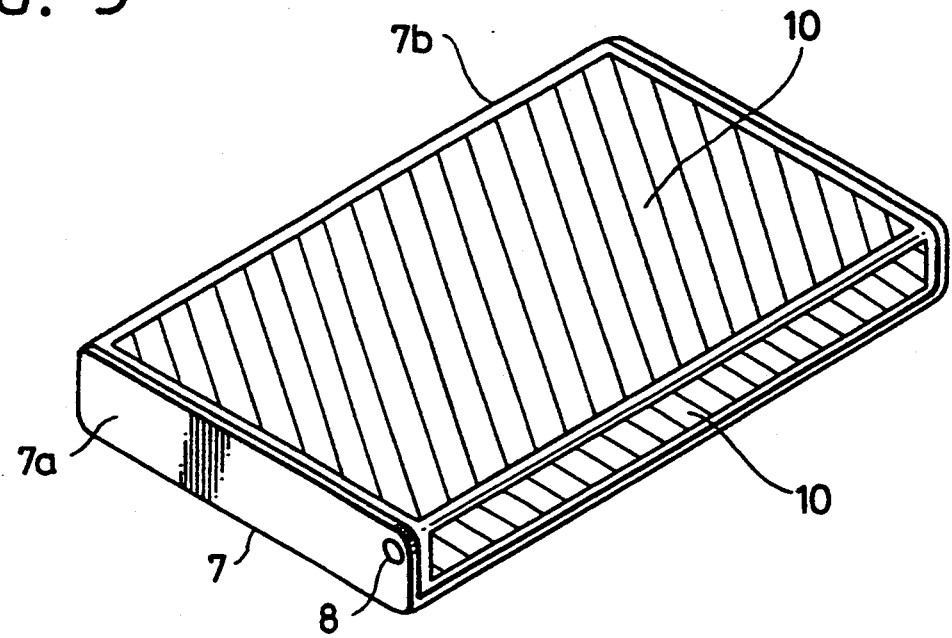
FIG. 3 is a perspective view showing the cassette preserving case according to the embodiment of the present invention under the condition that the lid thereof is closed.

FIGS. 2 and 3 show an example of a plastic cassette preserving case 7 in which the tape cassette 1 shown in FIG. 1 is kept. As shown in FIGS. 2 and 3, the cassette preserving case 7 is comprised of a case body 7a made of, for example, PS (polystyrene) resin and a lid 7b pivotally attached to the case body 7a by means of a hinge portion 8 so as to become freely openable and closable relative to the case body 7a. In the cassette preserving case 7, at least any one of the case body 7a and the lid 7b is made of a transparent material so that the user can visually confirm the tape cassette 1 accommodated or preserved in the cassette preserving case 7 from the outside.

When the tape cassette 1 is not in use, the tape cassette 1 is put into a tape cassette accommodating portion 11 of the cassette preserving case 7 and then preserved under the condition that the lid 7b is closed, whereby the magnetic tape T provided within the tape cassette 1 can be protected from being smudged by dusts or the like. On the surface of the cassette preserving case at its predetermined position, i.e., on the upper portion and the front side surface portion of the lid 7b is formed the write area 10 in which a title of musical composition recorded on the tape cassette 1 or the like is written. Further, though not shown, on the same surface of the write area 10 can be formed other printing portions such as logotype, pattern or the like.

The write areas 10 on the tape cassette 1 and the cassette preserving case 7 are formed by direct printing such as screen process printing, pad printing or the like. In this case, if the write area 10 is printed by using an ink (inorganic filler $CaCO_3$ containing a mat material) that is used to form a coarse surface in which pattern or the like can be written, then a writing property equivalent to that of a paper can be maintained for an oil base pen, a ball-point pen, a pencil or the like. However, in the case of a water base pen, a water base ink of the water base pen is cohered and a writing property thereof is considerably deteriorated. Also, the water base ink is not dried and easily blurred when rubbed with the finger. Having considered a variety of printing ink materials used to form a write area in which patterns or the like can be written even with the water base pen, a protein powder having natural collagen for its main component received a remarkable attention. Then, an ink that contains such protein powder is used as the printing ink to print the surfaces of the tape cassette 1 and the cassette preserving case 7 to thereby form the write areas 10.

The printing ink used to form the writable area uses as an ink base a general screen process printing ink or pad printing ink (macromolecule resin such as polyvinyl chloride based resin, rubber based resin, polyester based resin, cellulose based resin or the like is used as a binder and aromatic hydrocarbon based solvent, ketone based solvent, alcohol based solvent, ether based solvent, ester based solvent or the like is used as a main solvent or diluent into which proper pigment or auxiliary such as titanium oxide, calcium carbonate, carbon black or the like is added). Then, a proper amount of protein powder having commercially available natural collagen for its main component is added to this ink base.

As the protein powder having natural collagen for its main component, there can be enumerated an SF grade (manufactured by IDEMITSU PETROCHEMICAL INDUSTRIES, LTD.) whose average powder size is 5 μm, for example.

The protein powders are not mixed to one another inherently. Therefore, when the protein powders are added to the ink base as described above, the protein powder can be uniformly mixed into the ink base with ease. Also, proper spacing can be produced among the powders of the protein powder and hence a water component can be supplied into the spacings.

When something is written on the write area 10 formed by printing the printing ink containing the above protein powder with a water based pen, the water based ink from the water based pen can be prevented from being floated owing to hydrophilic group of the protein powder so that a sufficient wet property can be maintained. Accordingly, the write area of the present invention can present satisfactory writing property and drying property for the water based ink. Further, even when the writing is made with an oil based pen, a ball-point pen, pencil or the like, the write area of the present invention can provide the writing property substantially equal to that of the normal write ink and paper.

In the printing ink that is used to form the write area according to the present invention, the writing property and the drying property become satisfactory as the containing amount of the protein powder therein is increased. On the other hand, fundamental physical characteristics required by the printing ink, such as adhesive strength, abrasion resistance, scratch resistance or the like onto the printing surfaces of the tape cassette 1 and the cassette preserving case 7 cannot be maintained. Therefore, it is preferable that the containing amount of the protein powder in the printing ink is selected to be less than 30 weight % when the ink base is a white ink and is selected to be 40 weight % when the ink base is other ink. The reason that the proper containing amounts of the protein powder become different when the ink base is the white ink and other color ink will be described below. That is, the white ink has much more pigments as compared with other color ink, i.e., small resin component. Accordingly, if the resin amount of larger than the constant amount is required in order to avoid the fundamental physical characteristics of ink from being deteriorated, the containing amount of the protein powder is necessarily suppressed when the ink base is the white ink.

In the write area 10 printed by using the printing ink which contains a proper amount of the protein powder, satisfactory write characteristic and drying characteristic can be obtained. In this case, there is provided the following method in order to improve these characteristics.

As the printing ink used in the printing of the write area 10, in addition to the above-mentioned protein powder, there is contained a proper amount of inorganic pigment having a powder size larger than that of the pigment contained in the pigment or that of the protein powder. As the inorganic pigment having the large powder size, it is suitable that calcium carbonate is employed. In general, in the ink base, the powder size of the pigment is 1 μm and the powder size of the protein powder is 5 μm is less than 5 μm, while the powder size of calcium carbonate is as large as 5 to 30 μ. The calcium carbonate is added to the ink base together with the protein powder, thereby producing the printing ink. In this case, the containing amount of the protein powder and the calcium carbonate will be described. That is, the containing amount of the protein powder + calcium carbonate is less than 40 weight % when the ink base is the white ink. Further, the containing amount of protein powder + calcium carbonate is less than 50 weight % when the ink base is other color ink.

In the write area 10 formed by printing the printing ink that contains the calcium carbonate in addition to the protein powder as the printing ink, the powder size of calcium carbonate is large as compared with that of the pigment or protein powder in the above-mentioned ink base. Therefore, proper spacing are produced on the surface of the printed printing ink. Therefore, when something is written in the write area 10 with the water base pen, the water based ink of the water base pen is permeated into the spacings, thereby obtaining higher writing property and higher drying property. Further, in this write area 10, the surface is made coarse by the calcium carbonate so that the scratch resistance provided when something is written with the pen is improved, i.e., the writing can be made with proper scratch resistance, thereby further improving the writing characteristic.

As the inorganic pigment having a powder size larger than that of the protein powder, there can be utilized, in addition to calcium carbonated, zinc oxide, zinc carbonate, aluminum oxide, aluminum silicate, barium sulfate or the like. Furthermore, the tape cassette 1 and the cassette preserving cassette 7 on which the printing area is formed are not limited to those of the embodiments and can be similarly applied to those made of a variety of plastic materials such as ABS, PS, PP or the like.

As described above, the recording medium accommodating cassette and the cassette preserving case according to the present invention can achieve the following effects because the writable area is formed thereon.

Since the label made of paper is not utilized unlike the prior art, such writable area can be prevented from being torn off even when the environmental conditions are changed or the writable area is scratched with the finger. Such effects become particularly remarkable when the write area is small.

Since the writable area is formed by the printing, the write area of complex structure that the conventional label cannot form can be formed.

Since the present invention does not utilize a paper resource, the present invention can contribute to earth environment protection.

Since the writable area can be formed together with other printing portions (logotypes and design such as patterns of the like) at the same time by one printing process, this can leads to the reduction of cost. Further, the conventional label insertion process becomes unnecessary in the manufacturing process of cassette so that fraction defective of product can be reduced.

Further, since the writable area is formed by the printing process in the cassette preserving case, the index card that the conventional cassette preserving case requires becomes unnecessary. Therefore, the cassette preserving case can be miniaturized and recording information written can be prevented from being lost.

While the tape cassette (audio compact cassette) is described as the recording medium accommodating cassette as describe above, the recording medium accommodating cassette is not limited to the tape cassette and can be applied, for example, to disc cassette or the like.

Furthermore, while the writable area is formed on the outer side surface of the cassette preserving case as described above, the present invention is not limited thereto and the writable area can be formed on the inner surface of the cassette preserving case.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A plastic cassette storage case having a cassette-accommodating portion in which a recording medium cassette is accommodated, comprising:
    a writable area printed at a predetermined position on an outer surface of said cassette storage case using a printing ink containing a predetermined amount of protein powder having a natural collagen as its main component;
    wherein said writable area comprises a single writable layer printed on the outer surface of said case at the predetermined position, and wherein said natural collagen contains a hydrophilic group and has a particle size of about 5 $\mu$m, said natural collagen being dispersed in said single layer such that the spacing between the particles of the collagen and the hydrophilic group of said collagen allow water based ink to permeate into said single layer.

2. A plastic cassette storage case according to claim 1, wherein said printing ink is a printing ink which further contains a predetermined amount of inorganic pigment which has a particle size that is larger than the particle size of said protein powder.

3. A plastic cassette storage case according to claim 1, further comprising a case body and a case lid pivotally supported to said case body so as to pivot between an open position and a closed position, and wherein at least one of said case body and said case lid is made of a transparent plastic material.

* * * * *